US008134791B2

(12) United States Patent
Haines et al.

(10) Patent No.: US 8,134,791 B2
(45) Date of Patent: Mar. 13, 2012

(54) DISC OPERATION SELECTION

(75) Inventors: Jonathan W. Haines, Boulder, CO (US); Timothy R. Feldman, Louisville, CO (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 12/700,565

(22) Filed: Feb. 4, 2010

(65) Prior Publication Data
US 2011/0188142 A1   Aug. 4, 2011

(51) Int. Cl.
*G11B 27/36* (2006.01)
*G06F 3/00* (2006.01)
*G06F 13/00* (2006.01)

(52) U.S. Cl. .................. 360/31; 710/6; 711/112
(58) Field of Classification Search ............... None
See application file for complete search history.

(56) References Cited

U.S. PATENT DOCUMENTS

| 5,570,332 | A | 10/1996 | Heath et al. |
| 6,170,042 | B1 | 1/2001 | Gaertner et al. |
| 6,339,811 | B1 | 1/2002 | Gaertner et al. |
| 7,114,029 | B1 | 9/2006 | Thelin |
| 7,471,486 | B1 | 12/2008 | Coker et al. |
| 2003/0056059 | A1* | 3/2003 | Fox et al. ................. 711/112 |
| 2007/0171793 | A1* | 7/2007 | Mesut et al. .............. 369/47.38 |

* cited by examiner

*Primary Examiner* — Daniell L Negron
*Assistant Examiner* — Regina N Holder
(74) *Attorney, Agent, or Firm* — David K. Lucente

(57) ABSTRACT

A method of identifying a string or chain of efficient or "good enough" disc operations for processing (a pseudo optimal chain) is provided. A "pseudo optimal chain" comprises a string or chain of operations that, while not necessarily the optimal string or chain, provides an efficient sequence of operations that can be determined by comparing individual operations to predetermined selection criteria. In contrast to a true optimization technique that can require computing up to N! combinations for N operations, the string or chain of efficient or "good enough" disc operations allows for relatively simpler computations.

20 Claims, 5 Drawing Sheets

DISC OPERATION SELECTION

SUMMARY

Implementations described herein provide scheduling of disc drive operations using at least one pseudo optimal chain of operations. A predetermined selection criteria is provided, and a plurality of data storage device operations (e.g., read and/or write operations) are compared to the predetermined selection criteria. Based on the comparison of the plurality of data storage device operations and the predetermined selection criteria, at least two of the plurality of data storage device operations are assigned to a pseudo optimal chain of operations for processing.

In another implementation, a system for a data storage device comprises a controller adapted to assign at least two of a plurality of data storage device operations to a pseudo optimal chain of operations based on a predetermined selection criteria.

In yet another embodiment, a computer readable storage media storing computer-executable instructions for executing on a processor a process that generates a pseudo optimal chain of operations for a data storage device is provided.

Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTION

A method of identifying a string or chain of efficient or "good enough" disc operations for processing (a pseudo optimal chain) is provided. A "pseudo optimal chain" comprises a string or chain of operations that, while not necessarily the optimal string or chain, provides an efficient sequence of operations that can be determined by comparing individual operations to predetermined selection criteria. In contrast to a true optimization technique that can require computing up to N! combinations for N operations, the string or chain of efficient or "good enough" disc operations allows for relatively simpler computations. In one particular implementation, for example, a method may identify a string or chain of operations using virtually no more memory resources than would be otherwise required for maintaining a write queue. This particular method provides for more quickly identifying a string or chain of disc operations that are efficient enough based upon a speed of search that is desired.

Figure 1:
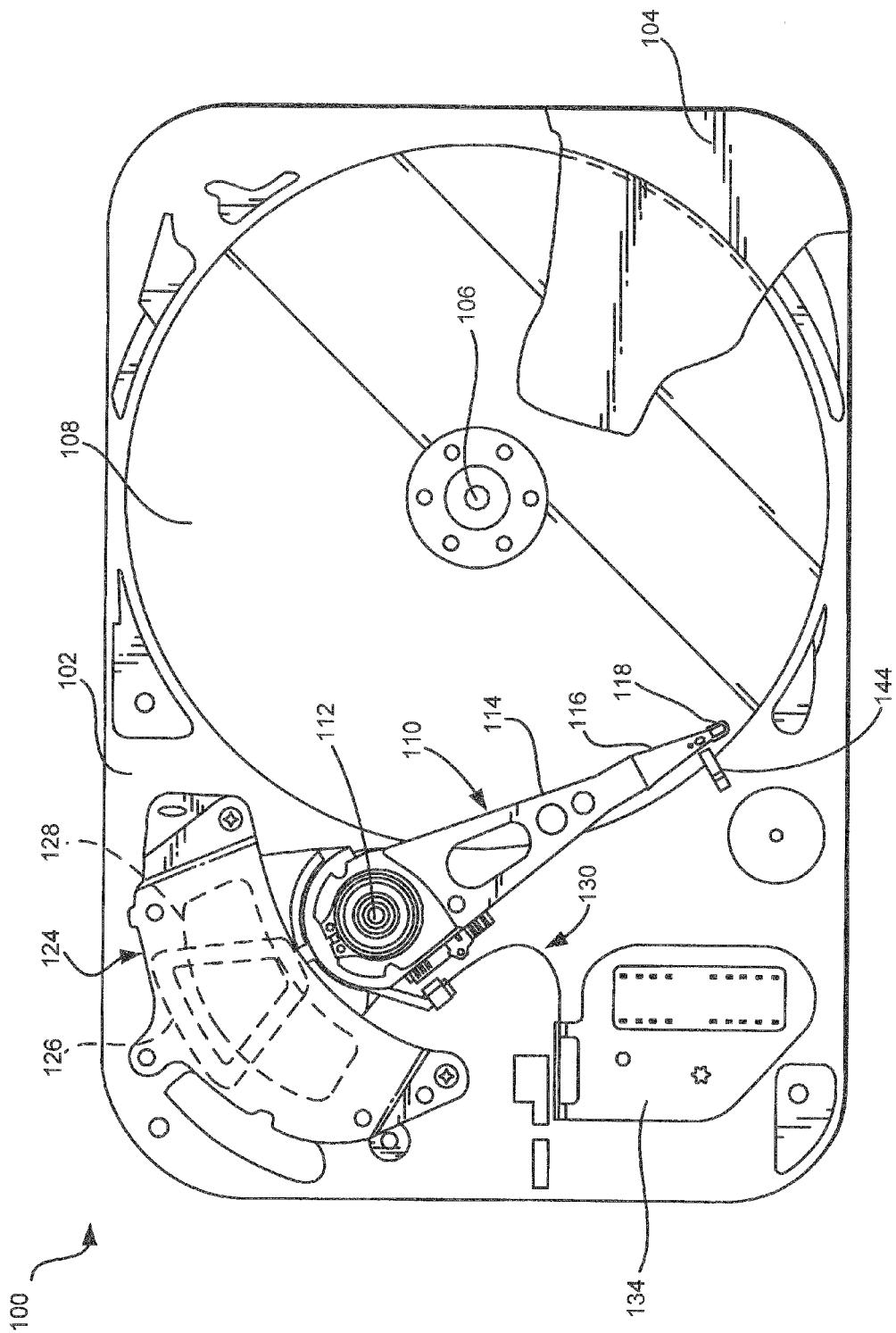
FIG. 1 illustrates a plan view of an example disc drive.

FIG. 1 illustrates a plan view of an example disc drive 100. The disc drive 100 includes a base 102 to which various components of the disc drive 100 are mounted. A top cover 104, shown partially cut away, cooperates with the base 102 to form an internal, clean environment for the disc drive in a conventional manner. The components include a spindle motor 106 that rotates one or more storage medium discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108. The distance between the head 118 and the storage media surface during flight is referred to as the fly height.

During a seek operation, the track position of the head 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the transducer heads 118 are caused to move across the surfaces of the discs 108.

The spindle motor 106 is typically de-energized when the disc drive 100 is not in use for extended periods of time. The transducer heads 118 are moved away from portions of the disc 108 containing data when the drive motor is de-energized. The transducer heads 118 are secured over portions of the disc not containing data through the use of an actuator latch arrangement and/or ramp assembly 144, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly 130 includes a printed circuit hoard 134 to which a flex cable connected with the actuator assembly 110 and leading to the head 118 is connected. The flex cable may be routed along the actuator arms 114 and the flexures 116 to the transducer heads 118. The printed circuit board 134 typically includes circuitry for controlling the write currents applied to the transducer heads 118 during a write operation, a preamplifier for amplifying read signals generated by the transducer heads 118 during a read operation, and a power supply to a head heater, which allows fine head to disc clearance control by setting the head temperature near the active head elements. The flex assembly 130 terminates at a flex bracket for communication through the base deck 102 to a disc drive printed circuit board (not shown) mounted to the bottom side of the disc drive 100.

A controller (e.g., a microprocessor) for the disc drive 100 may identify a string or chain of disc operations for processing as described below.

Figure 2:
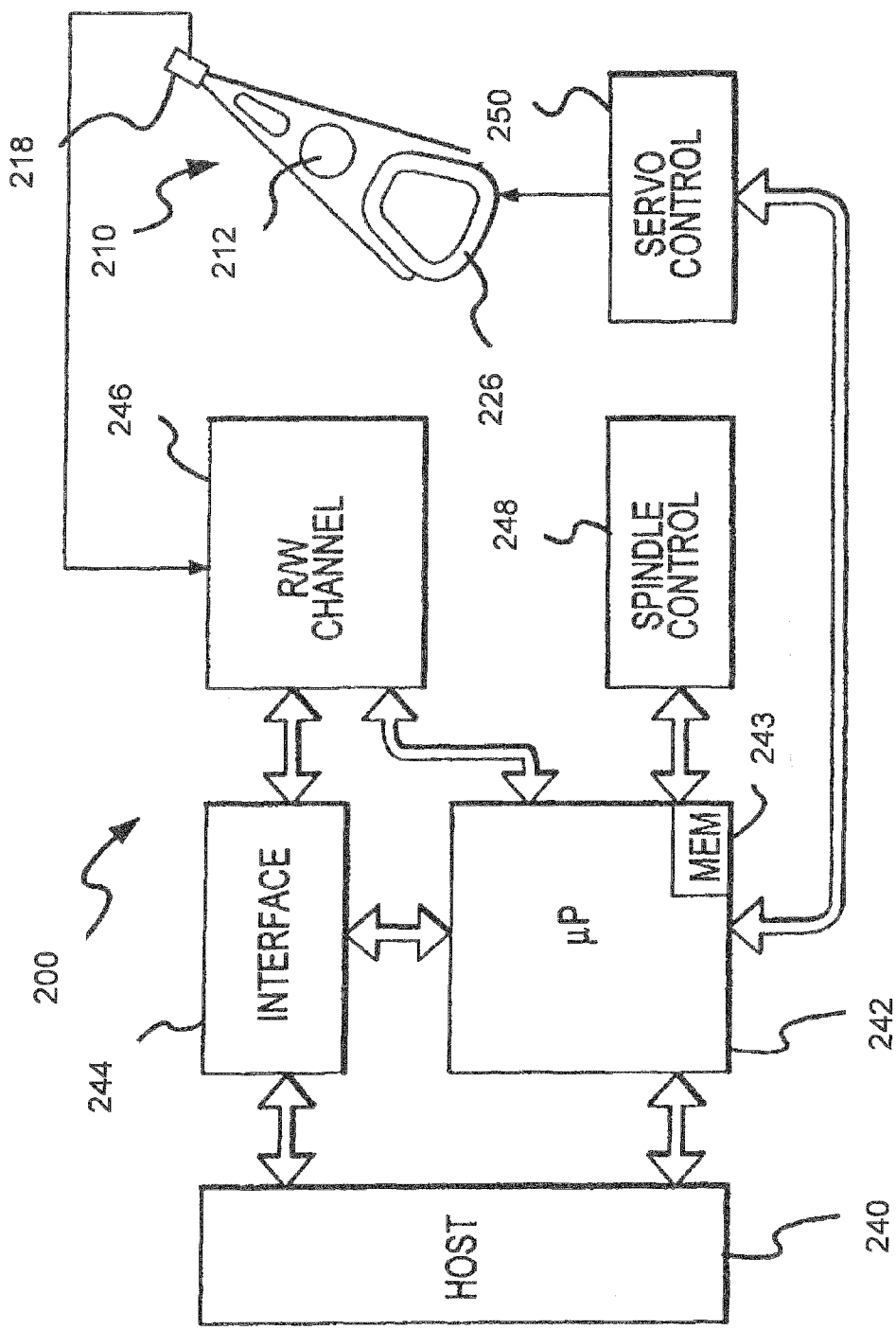
FIG. 2 illustrates an example functional block diagram of a disc drive.

FIG. 2 illustrates an example functional block diagram of a disc drive 200, generally showing the main functional circuits resident on a disc drive printed circuit board and used to control the operation of the disc drive 200. The disc drive 200 is shown in FIG. 2 to be operably connected to a host computer 240 in which the disc drive 200 is mounted in a conventional manner. Control communication paths are provided between the host computer 240 and a disc drive microprocessor 242, the microprocessor 242 generally providing top level communication and control for the disc drive 200 in conjunction with programming for the microprocessor 242 stored in microprocessor memory (MEM) 243. The MEM 243 can include random access memory (RAM), read only memory (ROM) and other sources of resident memory for the microprocessor 242.

The discs (e.g., discs 108 shown in FIG. 1) are rotated at a constant high speed by a spindle control circuit 248, which typically electrically commutates a spindle motor (e.g., the spindle motor 106 shown in FIG. 1) through the use of back electromotive force (BEMF) sensing. During a seek operation, the track position of the heads 218 is controlled through the application of current to the coil 226 of the actuator assembly 210. A servo control circuit 250 provides such control. During a seek operation the microprocessor 242 receives information regarding the velocity of the head 218. The microprocessor 242 uses that information in conjunction with a velocity profile stored in memory 243 to communicate with the servo control circuit 250, which will apply a controlled amount of current to the voice coil motor 226, thereby causing the actuator assembly 210 to be pivoted.

Data is transferred between the host computer 240 and the disc drive 200 by way of a disc drive interface 244, which typically includes a buffer to facilitate high speed data transfer between the host computer 240 and the disc drive 200. This buffer is used to store prefetched data. Data to be written to the disc drive 200 is thus passed from the host computer to the interface 244 and then to a read/write channel 246, which encodes and serializes the data and provides the requisite write current signals to the heads 218. To retrieve data that has been previously stored by the disc drive 200, read signals are generated by the heads 218 and provided to the read/write channel 246, which performs decoding and error detection and correction operations and outputs the retrieved data to the interface 244 for subsequent transfer to the host computer 240.

The microprocessor 242, for example, may generate efficient or "good enough" sequences of disc operations. In one implementation, for example, the microprocessor 242 identifies groups of operations that meet predetermined selection criteria. These groups of operations may comprise "pseudo optimal chains" of operations that may be efficiently performed by the disc drive.

Figure 3:
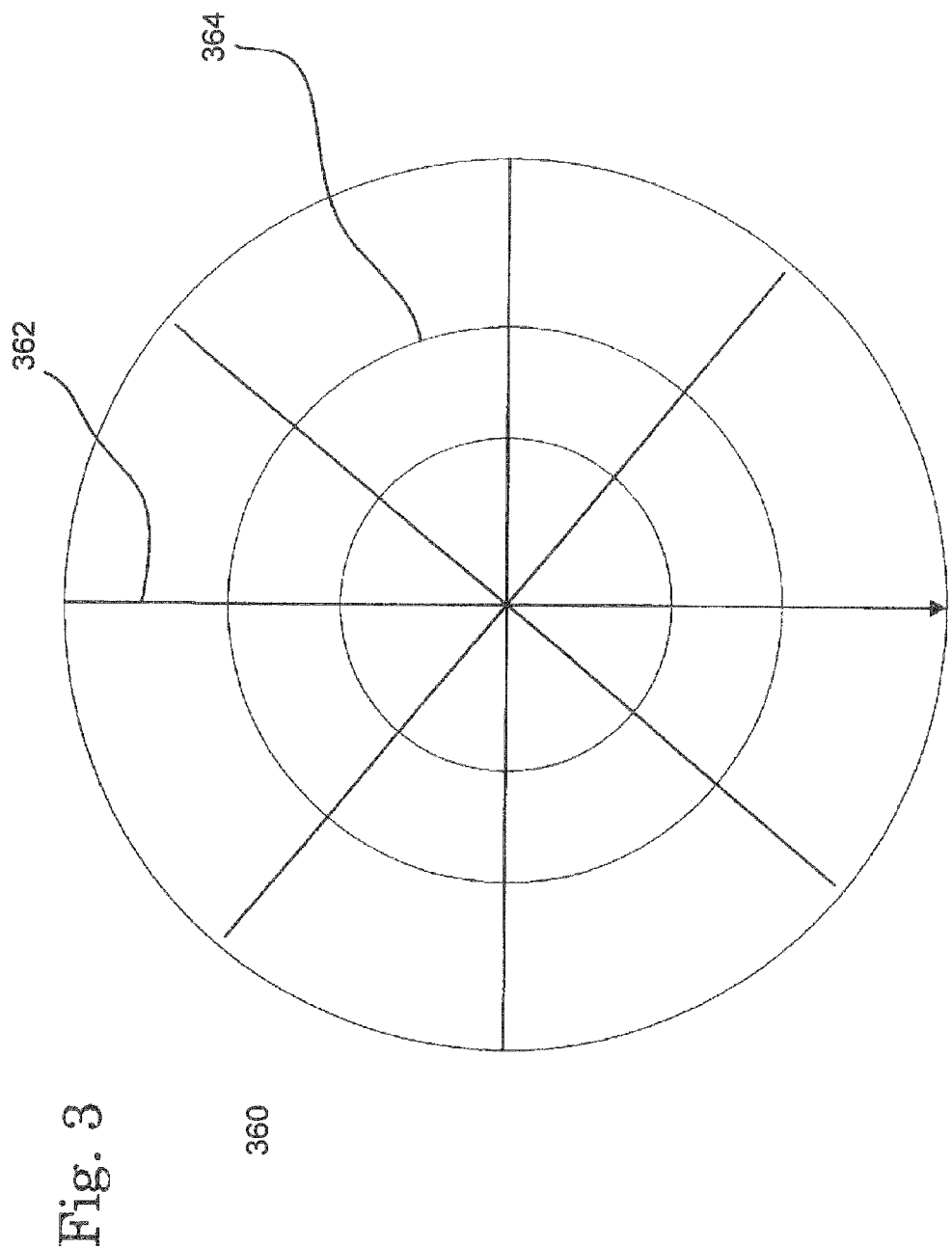
FIG. 3 illustrates an example disc from a disc drive.

FIG. 3 illustrates an example disc 360 from a disc drive. The disc is broken up into many slices or zones by servo burst quasi-lines 362. The number of servo burst quasi-lines varies and the number shown in FIG. 3 are for example only. These servo burst quasi-lines 362 extend radially from the center of the disc 360 to the outer edge. Though these bursts 362 appear as lines or arcs, their widths increase slightly from the inner portion of the disc to the outer portion so that the burst information contained within them is read at a constant rate regardless of their distance from the center of the disc. Each burst within the burst quasi-line 362 contains position information used to guide the actuator. Tracks 364 form concentric circles centered about the center of the disc 360. The number of tracks also varies and the number shown in FIG. 3 are also for example only. Commands received by the disc drive from the host computer contain track information which indicates the position for the target data on the disc. A disc drive may contain several stacked discs and each disc may contain data on each side. The command may also contain information indicating the proper disc and side as well as the proper sector within the zone.

Figure 4:
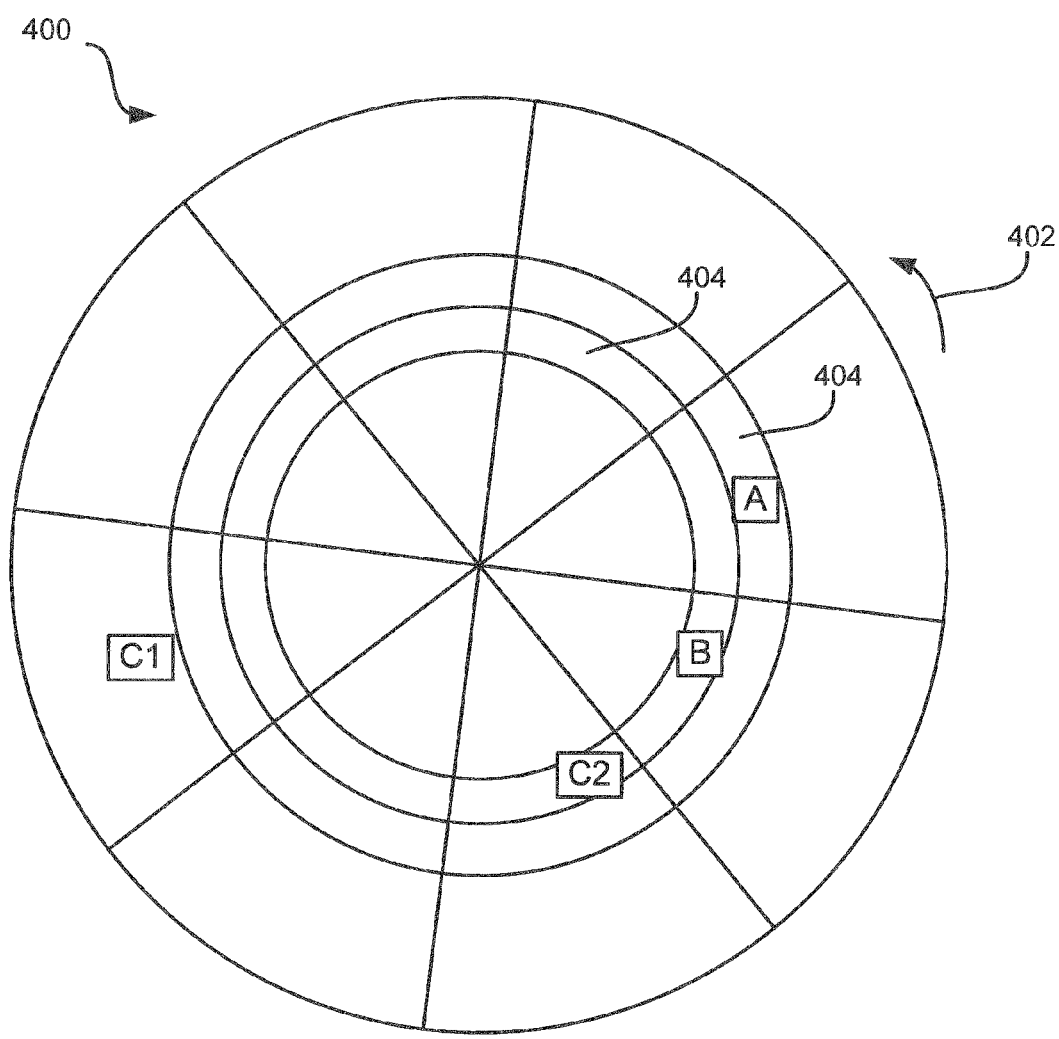
FIG. 4 illustrates a simplified diagram of example physical disc addresses or locations that correspond to example operations to be performed by a disc drive.

FIG. 4 illustrates a simplified diagram of example physical disc addresses or locations A, B, C1, and C2 that correspond to example read or write operations to be performed by a disc drive. In the simplified example, of FIG. 4, a group of operations that may be efficiently performed in sequence is identified based upon one or more predetermined selection criteria. The predetermined selection criteria, for example, may comprise relative radial and/or track location in which a head of the disc drive can access each location of a chain within a predetermined time and/or within a predetermined number of rotations of the disc. By way of example, the predetermined selection criteria may comprise selecting sequential operations of a string or chain corresponding to locations that are no more than one-eighth of a revolution of a disc and no more than two tracks apart from each other. One skilled in the art, however, would recognize from this disclosure that this is merely one possible set of selection criteria and that many others are contemplated.

In FIG. 4, for example, the locations A, B, C1, and C2 of disc 400 associated with operations may be analyzed according to the example selection criteria to identify one or more strings or chains of operations to be performed. As shown in FIG. 4, for example, the disc 400 rotates in a counter-clockwise direction as indicated by arrow 402. In this implementation, a chain of operations could start with an operation associated with location A. Location B is located within one-eighth of a revolution from location A and is also within one track 404 of the disc 400 from location A. The relative locations A and B meet the example predetermined selection criteria of being no more than one-eighth of a revolution of a disc and no more than two tracks apart from each other. Thus, the operations associated with locations A and B can be included in the same pseudo optimal chain of operations to be performed by the disc drive.

Next, location C1 can be analyzed. In this particular example, location C1 is located approximately one-half of a revolution from location A and approximately three-eighths of a revolution from location B. Thus, C1, at this point, does not qualify under the predetermined selection criteria and an operation is not be included in the pseudo optimal chain with the locations A and B. The location C2 is analyzed next. Since C2 is located within one-eighth of a revolution from location B and in the same track as location B, the location C2 satisfies the predetermined selection criteria and location C2 can be included in the pseudo optimal chain of operations associated with locations A-B-C2. Although in the example, the locations are shown being analyzed in the order that they ultimately appear in the example pseudo optimal chain of operations associated with locations A-B-C2, a given location may be pre-pended onto a "head" of a chain, appended onto a "tail" of the chain, or even inserted into the middle of chain being generated. Further, although location C1 did not qualify when it was analyzed after locations A and B, the location C1 may be re-analyzed at another portion of the pseudo optimal chain to see if it meets selection, criteria at another location in the pseudo optimal chain. Similarly, if the location C1 was unlikely to meet the selection criteria it may also be discarded from consideration in the pseudo optimal chain to save processing resources.

In determining a pseudo optimal chain, such as the example shown in FIG. 4, the current disc drive head position need not be a factor in determining the locations of that chain. Further, if the disc drive is performing an operation using an existing pseudo optimal chain while simultaneously determining members of a new pseudo optimal chain, the known location of the tail of the existing chain can be used in determining members of the new pseudo optimal chain. Similarly, a pseudo optimal chain may be broken into two or more portions if the chain would otherwise be missed by the disc drive head on a given revolution of the disc. In this manner, the chain may be broken so that the disc drive head may access locations it can on a given rotation. The remainder of the chain could then be re-assigned to a new chain or stand alone as a new chain. The location of the end of a given pseudo optimal chain can be used in determining which pseudo optimal chain to access next. In this particular implementation, where multiple chains have been identified, the disc drive head location (either at a given time or where it will be at the end of a scheduled operation) may be compared to a "head" location of each available chain to determine which chain of operations should be performed next.

Although the simplified example of FIG. 4 shows one example of predetermined selection criteria that may be used to identify one or more pseudo optimal chain of operations that may be performed in sequence, many other types of selection criteria are contemplated. In addition to a location (e.g., a radial or rotational location), selection criteria may depend on time (e.g., access time), resources, energy, or any other type of predetermined criteria that may be used to identify locations associated with a pseudo optimal chain of disc operations.

An example of selection criteria related to resources of the disc drive (or a system including the disc drive) may include an analysis of scarce resources of the system. For example, a number of data structure entries that are being consumed relative to the scarcity of that resource can be analyzed. Where a disc drive has limited memory capacity, operations using a lot of memory resources may be grouped together to be executed first to free up memory space for other operations. Similarly, energy considerations may also be used to construct the predetermined selection criteria. For example, where a group of operations may be performed together to minimize energy consumption, that group of operations may be assembled into one or more pseudo optimal chains to be performed sequentially. Certain repeated operations of the drive (e.g., a fast seek operation) may be avoided or reduced by grouping certain operations together. In addition, operations that result in unwanted acoustic noise (e.g., clicking or other unwanted noises) could be avoided.

In one particular implementation, a disc drive may generate a list of cached and/or queued operations (e.g., read and/or write operations). In this implementation, for example, the list of cached and/or queued operations may be no different than cached queue entries would otherwise appear in a reorder queue of a rotational position optimization (RPO) reorder queue. The list of cached and/or queued operations may be pulled out of a reorder queue as they are added in a linked-list fashion to one or more pseudo optimal chains. In this particular implementation, no additional memory is required to store the pseudo optimal chain beyond the chain headers.

A disc drive may use pseudo optimal chains of operations exclusively for scheduling operations of the disc drive, or may use pseudo optimal chains of operation in conjunction with other scheduling, such as a rotational position optimization scheduler. Due to the relatively simpler computations required, a pseudo optimal chain of operations may be used where computational resources are limited.

A pseudo optimal chain being constructed may be selected for operation based on any number of triggering conditions. For example, if a real or imposed upper limit is approached, the pseudo optimal chain may be selected for operation and placed in a queue of disc operations. Such a real or imposed limit, for example, may identify a point of diminishing returns for additional calculations that may otherwise be performed to continue to add new positions to the chain. Similarly, if the disc needs additional resources (e.g., queue descriptors) being used in the calculations, the pseudo optimal chain being constructed may be completed to free up the additional resources. For example, if the disc is within M entries of starvation of queue descriptors, stopping processing of the chain may free up additional queue descriptors for the disc.

In addition if a queue of operations (e.g., a reorder queue) for the disc is below a predetermined level (e.g., K entries from empty) or if a flush cache command is received, the pseudo optimal chain being constructed may be placed into the queue. While a disc drive might normally look for efficient chains, latency may be decreased and throughput may be increased for a known, selected set of operations by merely placing the current pseudo optimal chain into the queue. Selecting the current chain instead of continuing to process it, for example, may be used to optimize time and/or power.

If a change in host behavior is detected, the disc might also select the current pseudo optimal chain for operation. Such a change in host behavior, for example, may indicate that a region-of-usage on the disc is about to change as well. Further, where multiple pseudo optimal chains exist that together create a longer, efficient chain, the disc drive may stop adding new entries into the pseudo optimal chain and may combine it with other already identified chains.

When a pseudo optimal chain is triggered for handling, the disc drive can stop analyzing that chain. This may be used to free up resources to perform other processing, such as performing normal RPO searching, searching for another pseudo optimal chain, or other processing that does not have to be executed on a command-by-command basis during the initial processing of the command.

When a pseudo optimal chain is triggered for handling, an additional operation of selecting a starting point within the pseudo optimal chain may be performed where there is no identified starting point. Where chains have been populated based on radial proximity, for example, a starting point for the chain may be selected depending on any number of factors.

As queue entries are freed, the entries may be put back into a free pool, or an entire linked list could be returned after an entire pseudo optimal chain is handled. In the second example, host transfers may be held off if the cache descriptors are needed before more host commands can be processed.

A pseudo optimal chain approach may also be used in combination with other methods such as traditional RPO approaches. A disc drive may be able to switch on-the-fly between a pseudo optimal chain approach and another approach depending on which approach provides the most benefit at any given time. For example, if a pseudo optimal chain approach is not providing a benefit over a traditional RPO approach, the RPO approach may be implemented until it is determined that a pseudo optimal chain approach will provide a benefit, or vice versa.

Figure 5:
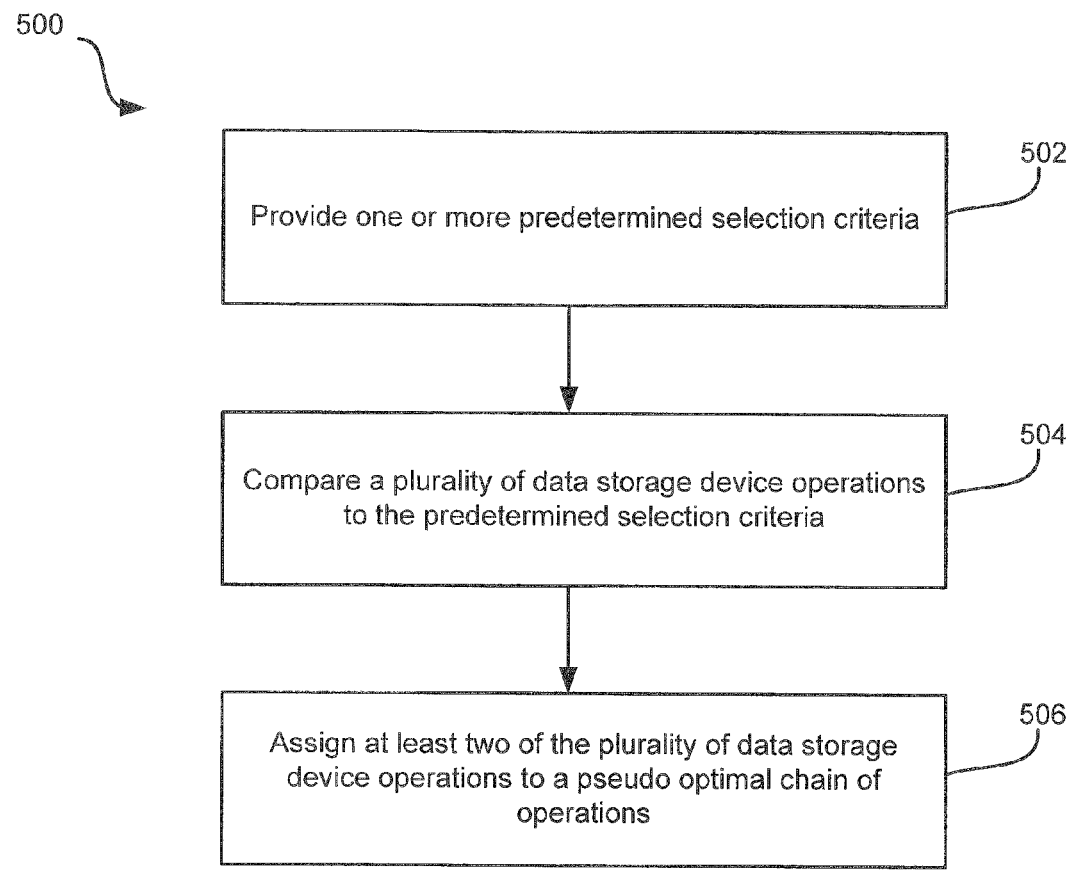
FIG. 5 illustrates example operations for generating a pseudo optimal chain of operations.

FIG. 5 illustrates example operations 500 for constructing a pseudo optimal chain. In this particular implementation, one or more predetermined selection criteria are provided in operation 502. The predetermined selection criteria, for example, may comprise relative radial and/or track location in which a head of the disc drive can access each location of a chain within a predetermined time and/or within a predetermined number of rotations of the disc. By way of example, the predetermined selection criteria may comprise selecting sequential operations of a string or chain corresponding to locations that are no more than one-eighth of a revolution of a disc and no more than two tracks apart from each other. One skilled in the art, however, would recognize from this disclosure that this is merely one possible set of selection criteria and that many others are contemplated.

A plurality of data storage device operations, such as read and/or write commands, are compared to the predetermined selection criteria in comparing operation 504. Based on a result of the comparing operation 504, at least two of the plurality of data storage device operations are assigned to a pseudo optimal chain of operations in assigning operation 506.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products. One implementation of a computer program product provides a computer program storage medium storing instructions readable by a computer system and encoding a computer program. Another implementation of a computer program product may be provided in a computer data signal embodied in a carrier wave by a computing system and encoding the computer program.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   comparing each individual of a plurality of data storage device operations to one of selection criteria; and
   assigning at least two of the plurality of data storage device operations to a pseudo optimal chain of operations based on the comparsion.

2. The method of claim 1, wherein the selection criteria comprises rotational criteria.

3. The method of claim 1 wherein the selection criteria comprises radial criteria.

4. The method of claim 1, wherein the selection criteria comprises access time criteria.

5. The method of claim 1 wherein the selection criteria comprises system resource criteria.

6. The method of claim 1 wherein the selection criteria comprises energy consumption criteria.

7. The method of claim 1 wherein the at least two operations assigned to the pseudo optimal chain of operations are performed in sequence by a disc drive.

8. The method of claim 1, further comprising assigning at least two different data storage device operations to a second pseudo optimal chain of operations.

9. The method of claim 8, wherein a sequence of the pseudo optimal chain of operations and the second pseudo optimal chain of operations is determined based on a head position of the data storage device.

10. A system for a data storage device comprising:
    a controller adapted to assign at least two of a plurality of data storage device operations to a pseudo optimal chain of operations based on result of comparison of the each individual of the two operations to one of a plurality of selection criteria.

11. The system of claim 10 wherein the selection criteria comprises a rotational selection criteria.

12. The system of claim 10, further comprising:
    assigning the pseudo optimal chain of operations to a queue for disc operations if the number of disc operations in the queue for disc operations is below a predetermined level.

13. The system of claim 10, wherein the selection criteria comprises system resource criteria.

14. The system of claim 10, further comprising:
    assigning the pseudo optimal chain of operations to a queue for disc operations if a change in behavior of a host is detected.

15. The system of claim 10, wherein the controller is further configured to perform the at least two operations assigned to the pseudo optimal chain of operations in sequence.

16. The system of claim 10, wherein the controller is further configured to assign at least two different data storage device operations to a second pseudo optimal chain of operations.

17. The system of claim 16, wherein the controller is further configured to determine a sequence for performing the pseudo optimal chain of operations and the second pseudo optimal chain of operations based on a head position of the data storage device.

18. A method comprising:
    comparing each individual of a plurality of data storage device operations to one of selection criteria; and
    based on the result of the comparing operation, assigning at least two of the plurality of data storage device operations to a pseudo optimal chain of operations.

19. The method of claim 18, further comprising selecting the pseudo optimal chain of operations in response to detecting a change in the behavior of a host device.

20. The method of claim 19, further comprising assigning the pseudo optimal chain of operations to a queue if a number of entries in the queue is below a predetermined level.

\* \* \* \* \*